Feb. 7, 1967    P. P. USHER    3,302,915
REMOVABLE METAL CUSHION FOR HOSE OR PIPE CLAMP
Filed June 2, 1966
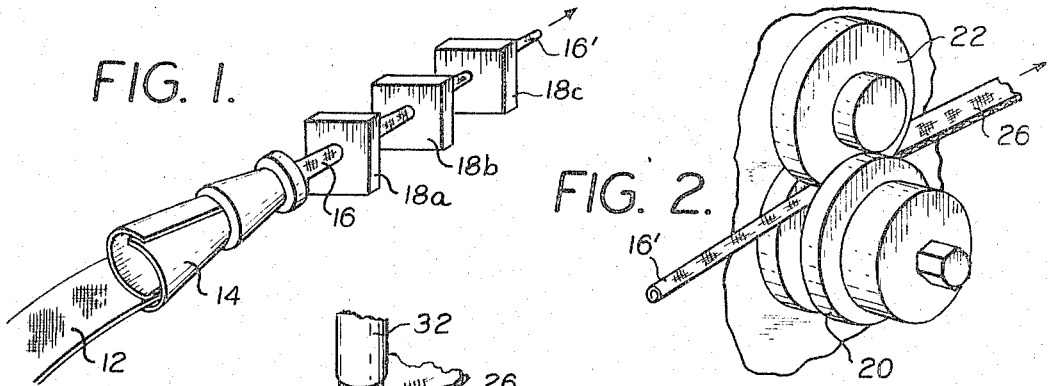
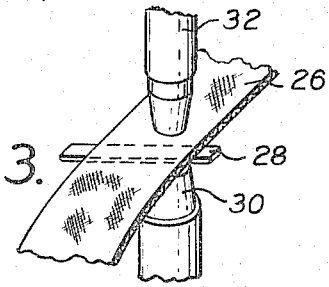
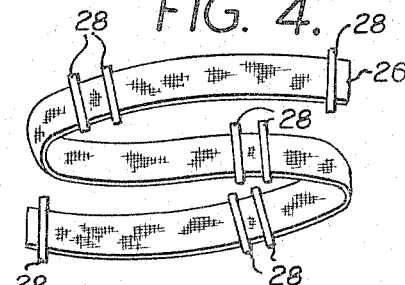
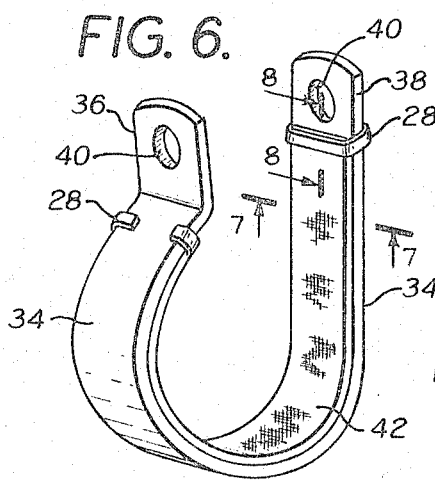
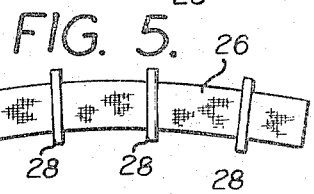
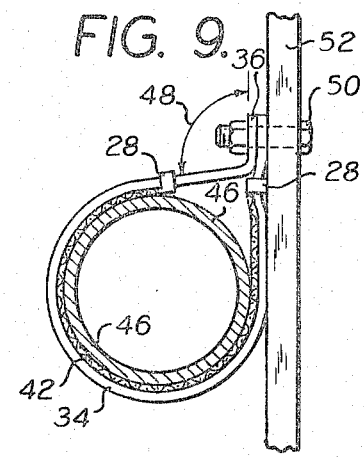
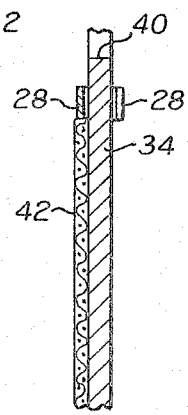
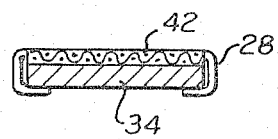
INVENTOR
PETER P. USHER
BY Sandoe, Neill,
Schotter & Wibstrom
ATTORNEYS.

United States Patent Office 3,302,915
Patented Feb. 7, 1967

3,302,915
REMOVABLE METAL CUSHION FOR HOSE
OR PIPE CLAMP
Peter P. Usher, Union, N.J., assignor to General Cable
Corporation, New York, N.Y., a corporation of New
Jersey
Filed June 2, 1966, Ser. No. 554,720
8 Claims. (Cl. 248—74)

This invention relates to supports for pipes and more especially to improvement in supporting means that hold a pipe with a cushion between the pipe and an outer clamping structure.

It is an object of the invention to provide an improved metal cushion structure, for use with hoses and pipes, with special features for holding a cushion in place. The holding members are secured to the cushion by a permanent bond, such as welding; and they are constructed so as to be formed over the pipe clamp in the field, or to be preformed in such a way that each holding member can be installed on the pipe clamp with a slide fit.

Another feature of the invention relates to the construction of the cushion material with spaced holders attached to it along its length so that separate cushions can be cut from the length of material as needed and each piece will have the necessary holders for connecting the cushion with a pipe clamp.

Another object is to provide an improved method of making fire-proof cushion assemblies for clamping pipes and the method is preferably a modified electric welding technique for producing holders that do not substantially thicken the cushion and that provides firm positioning of the connections where they do not interfere with the effectiveness of the cushion.

In the prior art, metallic cushions have been welded to pipe clamps, but it is objectionable because the connection must be made in the field, yet it has to be made with special equipment. This is a serious handicap when making initial installations and is particularly objectionable when worn cushions have to be removed and replaced. Others have bent the cushion itself around the clamp and some have used liners to hold the cushions in place. These do not produce the strength and convenience of the construction obtained with this invention.

Other objects, features and advantages of the invention will appear or be pointed out as the description proceeds.

In the drawing, forming a part hereof, in which like reference characters indicate corresponding parts in all the views;

FIGURE 1 is a diagrammatic view showing the way in which a piece of knitted wire material can be rolled up into a spiral preparatory to flattening to produce a multi-layer pad;

FIGURE 2 is a diagrammatic view showing the step of compressing the spiral of knitted wire material from FIGURE 1 into a flat multi-layer band or pad;

FIGURE 3 is a diagrammatic view showing the step by which holders are secured to the pad made in FIGURE 2, in accordance with this invention;

FIGURE 4 shows an elongated pad with holders secured to the pad at spaced locations, the holders being in groups at locations such that there are holders on opposite sides of places where the pad is to be cut to make individual cushions;

FIGURE 5 is a view similar to FIGURE 4 but showing the holders connected to the pad at evenly spaced locations along the length of the pad;

FIGURE 6 is a perspective view of a pipe clamp having a cushion of this invention on the clamp;

FIGURES 7 and 8 are sectional views taken on the lines 7—7 and 8—8, respectively, of FIGURE 6; and FIGURE 9 is a sectional view through a pipe held in the clamp shown in FIGURE 6.

FIGURE 1 shows a length of knitted wire mesh material 12 being drawn through a spiral horn 14 having a taper which delivers the material in the form of a spiral wall tube 16. This spiral wall tube 16 is drawn through reducing dies 18a, 18b and 18c to produce a spiral wall tube 16' of less diameter but with more layers of the knitted wire mesh material in the wall of the tube.

FIGURE 2 shows the spiral wall tube 16' travelling through a roll pass consisting of a grooved roller 20 and another roller 22 which fits into the groove of the roller 20. The groove in the roller 20 preferably has a flat bottom and the other roller 22 compresses the spiral wall tube 16' against the flat bottom of the groove in the roller 20 so as to produce an elongated flat strip or pad 26.

Although the knitted wire mesh material is flattened under considerable pressure in its passage between the rollers 20 and 22, the wire has resilience and it springs back to some extent so that the pad 26 has substantial thickness and resilience when subjected to compression.

FIGURE 3 shows the band or pad 26 subjected to the next operation in which a holding member or holder 28 is placed across the pad 26, extending transversely to the length of the pad, with the ends of the holder 28 extending beyond both sides of the pad, and the holder 28 is then secured to the pad by welding. This is done by placing the holder 28 on an electrode 30 and then bringing another electrode 32 into contact with the pad 26 above the holder 28. The pad 26 and holder 28 are subjected to sufficient pressure and heat by the electrodes 30 and 32 to melt the wires which are over the holder 28 and to fuse these wires to the holder.

It is a feature of the preferred construction of the invention that the holder 28 is made of metal having a thickness less than the thickness of the pad 26 and when the wires of the different layers of the pad 26, which overlie the holder 28, are used together, the thickness of the pad is so reduced that the combined thickness of the pad 26 and holder 28 at the locations of the different holders 28 is not any greater and preferably slightly less than the thickness of the pad 26 elsewhere. This is important in replacing pads as will be explained in connection with FIGURES 6 and 9.

In connecting the pad 26 to each of the holders 28, the electric welding step illustrated in FIGURE 3 reduces the thickness of the pad at each of the holders to a single layer, and in some cases the fusion of the wire forms a solid layer across the holder 28, but usually some of the wires remain in the fused zone, even though it is reduced to a single layer in thickness. Although other ways of securing the holders to the pad can be employed, the preferred method is to use electric resistance welding technique, and the same technique can be used to effectively seal any loose wires at the ends of the cushion after it has been cut.

FIGURE 4 shows a pad 26 with holders 28 at spaced locations along the length of the pad and these holders are located in groups or pairs, there being a holder 28 at each place where the pad 26 is to be cut to make separate cushions of a predetermined size. The actual spacing of the holders 28 which are close together allows for some excess beyond each holder so that the cut ends of the wire pad can be fused together if desired.

FIGURE 5 shows another section of the pad 26 where holders 28 are welded to the pad at equal spacings along the pad. This construction is used when it is not known what size cushions are to be eventually made from the pad, and the holders 28 are located close enough together so that there will be at least two holders for the smallest size of cushion. Other longer cushions may have more than two holders. This is not the ideal situation since it does not leave the pipe clamped entirely between portions of the pad which have maximum resilience but by having the holders at places where the combined thickness of the holder and pad is less than the other parts of the pad, the holder merely results in a short gap in the resilient pad that is clamping the pipe and does not interfere with the resilience of the clamp. The spacing of the holders 28 in FIGURE 5 may be one inch or two inches, these values being given merely by way of illustration.

FIGURE 6 shows a pipe clamp 34 which consists of a stiff band having straight ends 36 and 38 with a hole 40 for a bolt or other fastening to connect the ends 36 and 38 together and to clamp the band 34 around a pipe. A cushion 42 cut from a length of the pad 26 of FIGURE 4 is shown in FIGURE 6 in contact with the inside face of the band 34 and connected to the band by holders 28 at opposite ends of the cushion 42.

The cushion 42 is preferably approximately the same width as the band 34. Each of the holders 28 is made of relatively stiff metal which is maleable and which can be bent outward and upward along the side edges of the band 34 and then bent inward across the outside surface of the band as shown in FIGURE 6. There are two techniques used with this invention. One is to supply the band with the holders 28 straight and to bend them around the band 34 in the field at the time of installation. The other technique is to preform the holders 28 and to apply the cushion 42 to the band 34 by sliding the holders 28 over the straight end 38. The cushion 42 can slide along the band 34 until the forward holder 28 reaches the position shown in FIGURE 6, and by this time the second holder 28 has been slipped over the straight end 38 and moved far enough to clear the portion of the end 38 which receives the clamping bolt.

Preforming the holders 28 has the advantage that they can be shaped more accurately and more uniformly so that they have running or sliding clearance on the band 34 and this facilitates subsequent removal of the cushion 42 in the event that it becomes too worn and has to be replaced by a new cushion.

FIGURE 9 shows the clamping band 34 of FIGURE 6 clamping a pipe 46. The construction shown has an arcuate portion of the band 34 equal to substantially 270° which contacts with the outside of the pipe 46 to hold the cushion 42 against the pipe. The straight end 36 of the clamping band meets the other portion of the band at an angle 48 which is substantially a right angle. The other straight end 38, meets the arcuate portion of the band 34 along a tangent course. This has the advantage of providing a running or sliding clearance for the preformed holders 28 to travel along the end 38 and around the curved portion of the band 34. Because of the length of the holders 28, they cannot travel around a bend as sharp as that at the angle 48. It is, therefore, a feature of the preferred embodiment of the invention that at least one end of the clamping band merge with the arcuate portion of the band along a portion which, while not necessarily straight, is free of any abrupt turns which would interfere with the sliding or running clearance of the holders 28 on the clamping band.

When the cushion 42 is to be removed for replacement by a new cushion, a bolt 50, which holds the band 34 closed and clamped to a support 52, is removed and the band 34 springs open to some extent, as shown in FIGURE 6. However, the extent to which the band springs open may not leave much clearance around the pipe particularly if the band has been clamped tightly for a long time. If the band expands very little, so that the clearance between the pipe and the band 34 is not much greater than what little expansion occurs in the cushion 42, it is still possible to slide the cushion 42 on the straight band 34; and this is possible because of the fact that the holder 28 at the far end of the cushion 42, does not require any more clearance in sliding around the band 34 than does the rest of the cushion 42. There will always be clearance for the cushion 42 since the band 34 has been clamped to the pipe with this clearance existing. Therefore when the clamping band is loosened, the cushion 42 can be slid lengthwise along the band, and the holder 28, which is not any thicker than the rest of the cushion 42, amidst the entire cushion assembly to slide out of the band 34 for replacement by a similar, unworn cushion which is slid onto the band in a reverse process to that by which the worn cushion is removed.

The preferred embodiment of the invention has been illustrated and described, but changes and modifications can be made, and some features can be used in different combinations without departing from the invention as defined in the claims.

What is claimed is:

1. A metal cushion structure for a pipe clamp or the like including an elongated pad made of overlapping and multi-directional portions of wire forming a resilient pad for contact with an inside face of a pipe clamp, a holder comprising a strip of maleable material extending transversely of the length of the pad and in contact with one of the faces of the pad and generally parallel to the inside face at a location along the pad where the holder is in contact with the pad, said holder being permanently bonded to the pad and having portions extending beyond both sides of the pad for passing around the sides of a clamp and inward over a part of the width of the outside of a clamp, and another similar holder separate from the first holder and connected with the pad at a substantial distance along the pad from the first holder.

2. The metal cushion structure described in claim 1 characterized by the pad being made of knitted wire and comprising a plurality of layers of knitting, and the pad being thinner at the locations where the holders are secured to the pad, the combined thickness of the pad and each holder, where the holder contacts with the pad, being not greater than the thickness of the other parts of the pad.

3. The metal cushion structure described in claim 2 characterized by the holders being made of metal and being welded to the pad, and wires of superimposed layers of knitting of the pad being fused together in the welds to reduce the thickness of the pad at said holders.

4. The metal cushion structure described in claim 3 characterized by there being one holder adjacent to each end of the pad and the pad between the holders being free of other holders and having its full multi-layer resilience.

5. The metal cushion structure described in claim 1 characterized by the elongated pad being of a length equal to at least several cushions for pipe clamps of the size for which it is intended, and holders secured to the pad at spaced locations along the length of the pad including some holders located closer together than other holders, the more closely spaced holders being at opposite sides of the regions where the pad is to be cut for making cushions for pipe clamps of predetermined size.

6. The metal cushion structure described in claim 1 characterized by each holder having its opposite end portions beyond the sides of the pad extending upward away from the pad and then inward over the pad generally parallel to the part of the holder that is secured to the pad.

7. The metal cushion structure described in claim 1 characterized by the structure comprising a pipe clamp which includes a stiff band with a curved pipe-clamping face of substantially more than 180° of arc, straight ends of the band that connect with a support, the pad being in contact with the inside face of the band, and ends of the holder extending outward past the side edges of the band and then part way across the outside surface of the band, the space between the ends of the holder outside of the band and the surface of the pad that confronts the inside of the band being enough greater than the thickness of the band to provide a running clearance for the holder along the band, and at least one of the straight ends of the band merging with the curved portion of the band along a surface that is free of abrupt turns whereby the running clearance for the holders extend from the straight end of the band across the region of merger to the arcuate portion of the band.

8. The metal cushion structure described in claim 7 characterized by one of the straight ends of the band merging with the curved part of the band along a tangent course, the pad at the location of the holders being thinner than elsewhere and the combined thickness of the pad and holders at the locations of the holders being at least as thin as the other portions of the pad so that with the clamp loosened on a pipe, the holders can slide around any part of the pipe that the rest of the pad can slide around when replacing a worn pad on a clamp that has a pipe extending through the clamp, the curved part of the clamp having an arcuate extent of approximately 270°, and the holders being located beyond the 270° arc and beyond the portion of the band that clamps the pipe so that it is the part of the pad between the holders that contacts with a pipe in the clamp.

References Cited by the Examiner
UNITED STATES PATENTS

| | | | |
|---|---|---|---|
| 2,215,283 | 9/1940 | Adler | 248—74 X |
| 2,345,275 | 3/1944 | Morehouse | 248—68 |
| 3,015,465 | 1/1962 | Schmitt | 248—74 |
| 3,139,253 | 6/1964 | Crawford | 248—74 |

CLAUDE A. LE ROY, *Primary Examiner.*